United States Patent
Doran et al.

(10) Patent No.: US 9,799,003 B2
(45) Date of Patent: *Oct. 24, 2017

(54) CONTEXT-DEPENDENT TRANSACTIONAL MANAGEMENT FOR SEPARATION OF DUTIES

(75) Inventors: James R. Doran, New Milford, CT (US); James R. Kozloski, New Fairfield, CT (US); Clifford A. Pickover, Yorktown Heights, NY (US); Murali Vridhachalam, Wappingers Falls, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 72 days.

This patent is subject to a terminal disclaimer.

(21) Appl. No.: 13/556,711

(22) Filed: Jul. 24, 2012

(65) Prior Publication Data

US 2014/0006095 A1   Jan. 2, 2014

Related U.S. Application Data

(63) Continuation of application No. 13/539,995, filed on Jul. 2, 2012.

(51) Int. Cl.
  *G06Q 10/10* (2012.01)
  *H04L 29/08* (2006.01)
  *H04L 29/06* (2006.01)

(52) U.S. Cl.
  CPC ............ *G06Q 10/10* (2013.01); *H04L 63/102* (2013.01); *H04L 67/1097* (2013.01)

(58) Field of Classification Search
  CPC ......... G06Q 20/4014; G06Q 10/06393; G06Q 10/10; G06Q 30/0201; G06Q 40/04;
  (Continued)

(56) References Cited

U.S. PATENT DOCUMENTS 6,158,010 A * 12/2000 Moriconi .............. G06F 21/552
  709/223
7,747,647 B2   6/2010 Canning et al.
  (Continued)

FOREIGN PATENT DOCUMENTS

CN   102137077 A   7/2011
CN   1453954 A   11/2013

OTHER PUBLICATIONS

Blount, Sumner and Maxim, Merritt. "The Role of Identity and Access Management in Achieving Continuous Compliance, " CA Technologies, May 2010.*
  (Continued)

*Primary Examiner* — Renae Feacher
(74) *Attorney, Agent, or Firm* — Cantor Colburn LLP; Vazken Alexanian

(57) ABSTRACT

Context-dependent transactional management of services within a cloud environment for an organization using business rules includes generating a partitioned graph representing the organization and the business rule, where the business rules include one or more separation of duties requirements. Upon receiving an access request from an end user of the cloud service, a determination is made if the access request to the cloud service violates any of the one or more separation of duties requirements. Based on determining that the access request to the cloud service does not violate any of the one or more separation of duties requirements, transaction with the cloud service is granted to the end user. Based on determining that the access request to the cloud service violates one of the one or more separation of duties requirements, access to the cloud service is denied to the end user.

11 Claims, 6 Drawing Sheets

(58) Field of Classification Search
CPC ........ G06F 21/316; G06F 21/31; G06F 21/40; G06F 2221/2113; G06F 21/00
USPC ....................................................... 705/7.28
See application file for complete search history.

(56) References Cited

U.S. PATENT DOCUMENTS

| | | | |
|---|---|---|---|
| 2002/0026592 A1* | 2/2002 | Gavrila et al. ................ 713/201 |
| 2003/0084343 A1* | 5/2003 | Ramachandran et al. .... 713/201 |
| 2003/0115322 A1* | 6/2003 | Moriconi ............... G02B 6/132 709/224 |
| 2003/0172161 A1* | 9/2003 | Rymon ................. G06Q 10/10 709/226 |
| 2006/0047605 A1* | 3/2006 | Ahmad .......................... 705/64 |
| 2006/0085189 A1* | 4/2006 | Dalrymple et al. ........... 704/250 |
| 2006/0230282 A1* | 10/2006 | Hausler ............... G06F 21/6218 713/182 |
| 2006/0248045 A1* | 11/2006 | Toledano .......... G06F 17/30463 |
| 2008/0021716 A1* | 1/2008 | Buss ...................... G06Q 10/10 705/317 |
| 2008/0098484 A1* | 4/2008 | Cicchitto et al. ............... 726/27 |
| 2008/0115190 A1* | 5/2008 | Aaron .............................. 726/1 |
| 2008/0288330 A1* | 11/2008 | Hildebrand et al. ............ 705/10 |
| 2008/0301765 A1* | 12/2008 | Nicol et al. ........................ 726/1 |
| 2009/0187962 A1* | 7/2009 | Brenneman ........... G06F 21/316 726/1 |
| 2009/0198548 A1 | 8/2009 | Kohler et al. |
| 2009/0248440 A1* | 10/2009 | Becker .................. G06Q 50/22 705/2 |
| 2009/0249440 A1* | 10/2009 | Platt et al. ........................ 726/1 |
| 2010/0043051 A1* | 2/2010 | Deputat .................. H04L 63/20 726/1 |
| 2010/0082377 A1 | 4/2010 | Hada et al. |
| 2010/0174754 A1 | 7/2010 | B'Far et al. |
| 2010/0192209 A1* | 7/2010 | Steeves ................ G06F 21/316 726/7 |
| 2010/0251329 A1* | 9/2010 | Wei .................... H04L 63/1408 726/1 |
| 2011/0029947 A1* | 2/2011 | Markovic ..................... 717/102 |
| 2011/0225647 A1* | 9/2011 | Dilley et al. ..................... 726/14 |
| 2011/0282969 A1* | 11/2011 | Iyer et al. ...................... 709/217 |
| 2012/0079556 A1* | 3/2012 | Wahl ................................. 726/1 |
| 2012/0159572 A1* | 6/2012 | Patel ..................... H04L 63/102 726/3 |
| 2012/0167197 A1* | 6/2012 | Kruger ................... G06F 12/00 726/16 |
| 2013/0067547 A1* | 3/2013 | Thavasi et al. .................. 726/7 |

OTHER PUBLICATIONS

Corradi, Antonio; Montanari, Rebecca and Tibaldi, Daniela, Context-based Access Control Management in Ubiquitous Environments,Proceedings of the Third IEEE International Symposium on Network Computing and Applications (NCA'04).*

Baracaldo, Nathalie; Masoumzadeh, Amirreza and Joshi, James, "A Secure, Contraint-Aware Role-Based Access Control Interoperation Framework," Network and System Security (NSS), 2011 5th International Conference on Date of Conference: Sep. 6-8, 2011 Date Added to IEEE Xplore: Oct. 27, 2011.*

Ogundele, Adewale, Alese, and Falaki, "A formal Structure of Separaton of Duty and Trust in Modelling Delegation Policy," JCS&T vol. 11, No. 2, Oct. 2011.*

Accorsi, et al., "Towards Forensic Data Flow Analysis of Business Process Logs", 2011 IEEE, IEEE Computer Society, 2011 Sixth International Conference on IT Security Incident Management and IT Forensics, pp. 3-20.

Botha, et al., "Separation of duties for access control enforcement in workflow environments", 2001 IBM, IBM Systems Journal, vol. 40, No. 3, 2001, pp. 666-682.

Brucker et al., "Idea: Efficient Evaluation of Access Control Constraints" 2010 Springer-Verlag; pp. 157-165.

Henrich et al., "Technical Report: Secure Cloud Computing through a Separation of Duties", European Symposium on Research in Computer Security, ESORICS 2010; 16 pages.

Simon et al., "Separation of Duty in Role-Based Environments", 1997 IEEE; pp. 183-194.

* cited by examiner

CONTEXT-DEPENDENT TRANSACTIONAL MANAGEMENT FOR SEPARATION OF DUTIES

CROSS REFERENCE TO RELATED APPLICATIONS

This application is a continuation of U.S. application Ser. No. 13/539,995 filed on Jul. 2, 2012 entitled CONTEXT-DEPENDENT TRANSACTIONAL MANAGEMENT FOR SEPARATION OF DUTIES, the entire contents of which are incorporated herein by reference.

BACKGROUND

The present invention relates to access management, and more specifically, to computer program products and systems for providing context-dependent transactional management for separation of duties.

In general, separation of duties involves a variety of controls relating to people, software, data and the like. Many organizations utilize separation of duties to control the access of individuals and groups to various software and data within the organization. Separation of duties can be used to prevent fraud and errors, to protect trade secret information, control transactions with a machine or business process, to control access to sensitive data, to enforce security and license policies and the like. One method of enacting separation of duties includes separating the functions and associated privileges for a single business process among multiple users. Business processes can generally be categorized into four types of functions: authorization, custody, record keeping, and reconciliation. To decrease the possibility of fraud or errors, a single person may not be authorized to be involved with more than one type of function of a business process. For example, the business process of reimbursement of company expenses includes the functions of requesting reimbursement and verification of the receipts. These functions should be separated and performed by different employees to prevent both fraud and errors.

Traditionally, many of the requirements of separation of duties were handled by controlling physical access to individual computers and software used by members of the organization. However, recently organizations have begun to utilize cloud computing services rather than locally deployed applications. In general, cloud computing refers to server-based computing that allows users to transact with server resources using a variety of devices. Cloud computing applications are provided by a server, which allows users to use the applications without downloading and installing applications on their own device. Accordingly, current separation of duties methods may not be suitable for use within cloud computing environments.

SUMMARY

According to an exemplary embodiment, a method for providing context-dependent transactional management within a cloud environment. The method includes receiving a request to create a business rule for controlling transaction with a cloud service for an organization and providing an instance of the cloud service for provisioning the business rule by generating a partitioned graph representing the organization and the business rule, wherein the business rule includes one or more separation of duties requirements. The method also includes receiving an access request from an end user of the cloud service and determining if the access request to the cloud service violates any of the one or more separation of duties requirements. Based on determining that the access request to the cloud service does not violate any of the one or more separation of duties requirements, the method includes granting the end user transaction with the cloud service. Based on determining that the access request to the cloud service violates one of the one or more separation of duties requirements, the method includes denying the end user transaction with the cloud service.

According to another exemplary embodiment, a method for providing a context-dependent firewall for an organization. The method including creating a partitioned graph representing the organization and one or more business rules, wherein each of the business rule includes one or more separation of duties requirements and determining a use context associated with the partitioned graph based on the one or more separation of duties requirements. The method also includes determining one or more confidence levels associated with a blocking action related to the use context, wherein the blocking action is indicative that the use context violates one of the one or more separation of duties requirements and creating the context-dependent firewall based on the one or more confidence levels associated with the blocking action.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
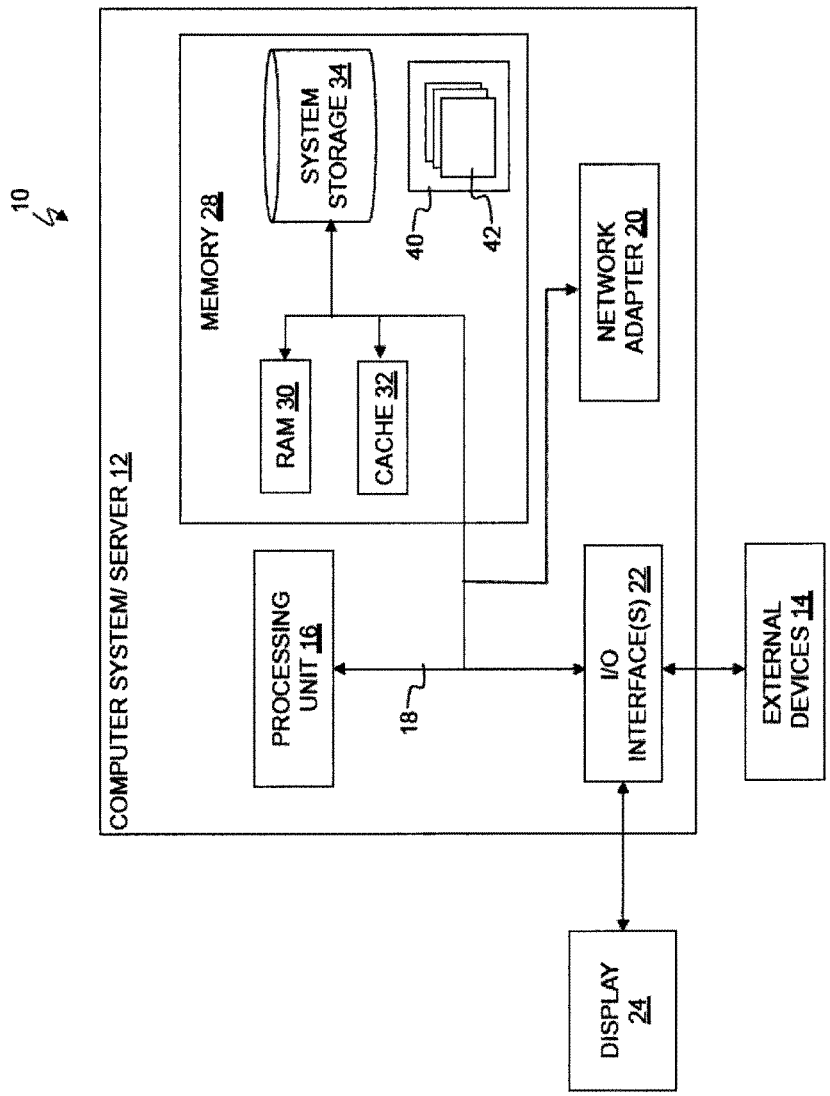
FIG. 1 illustrates a schematic of an example of a cloud computing node in accordance with exemplary embodiments.

Referring now to FIG. 1, FIG. 1 illustrates a schematic of an example of a cloud computing node. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in the cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
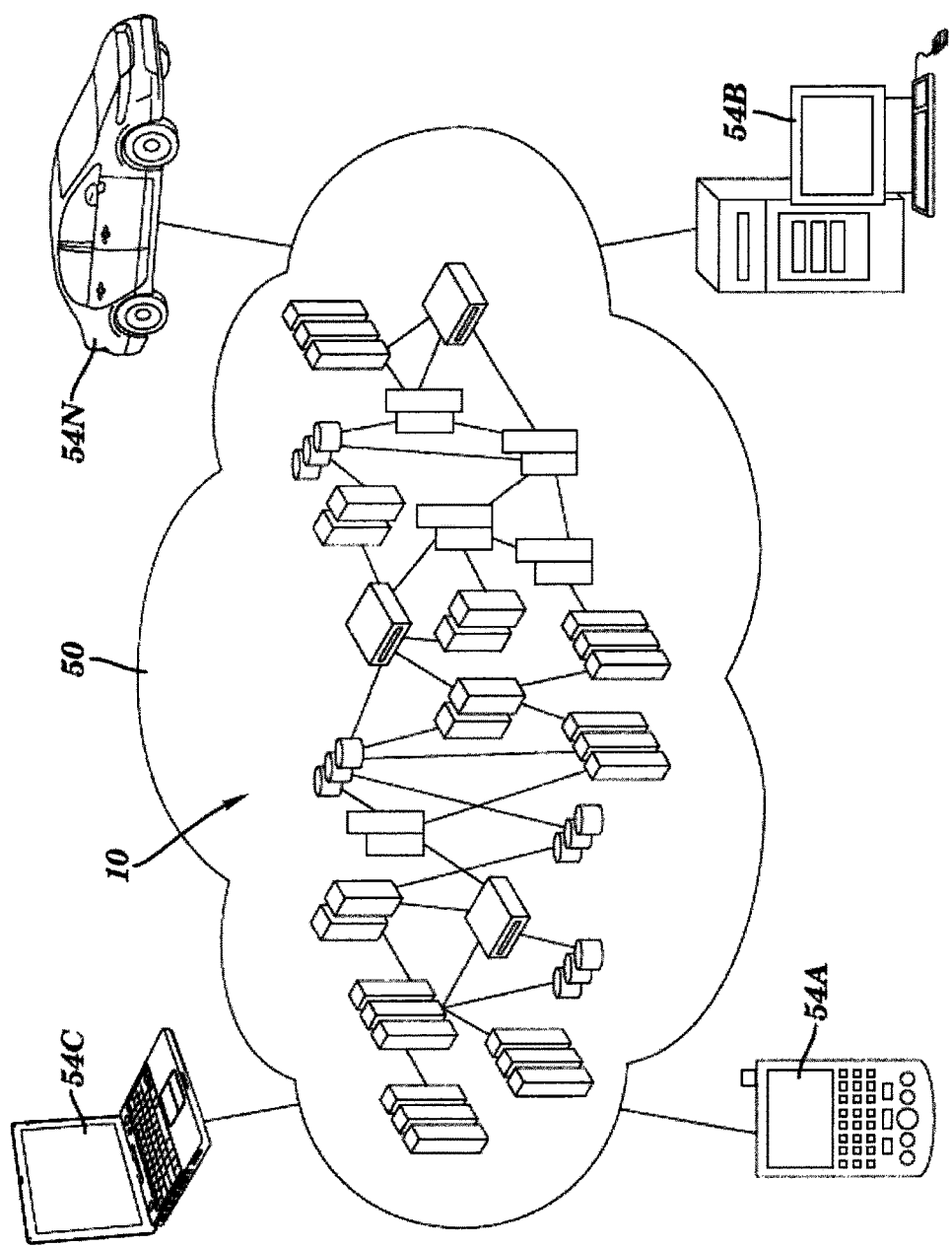
FIG. 2 illustrates a cloud computing environment in accordance with exemplary embodiments.

Referring now to FIG. 2, FIG. 2 illustrates a cloud computing environment 50. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
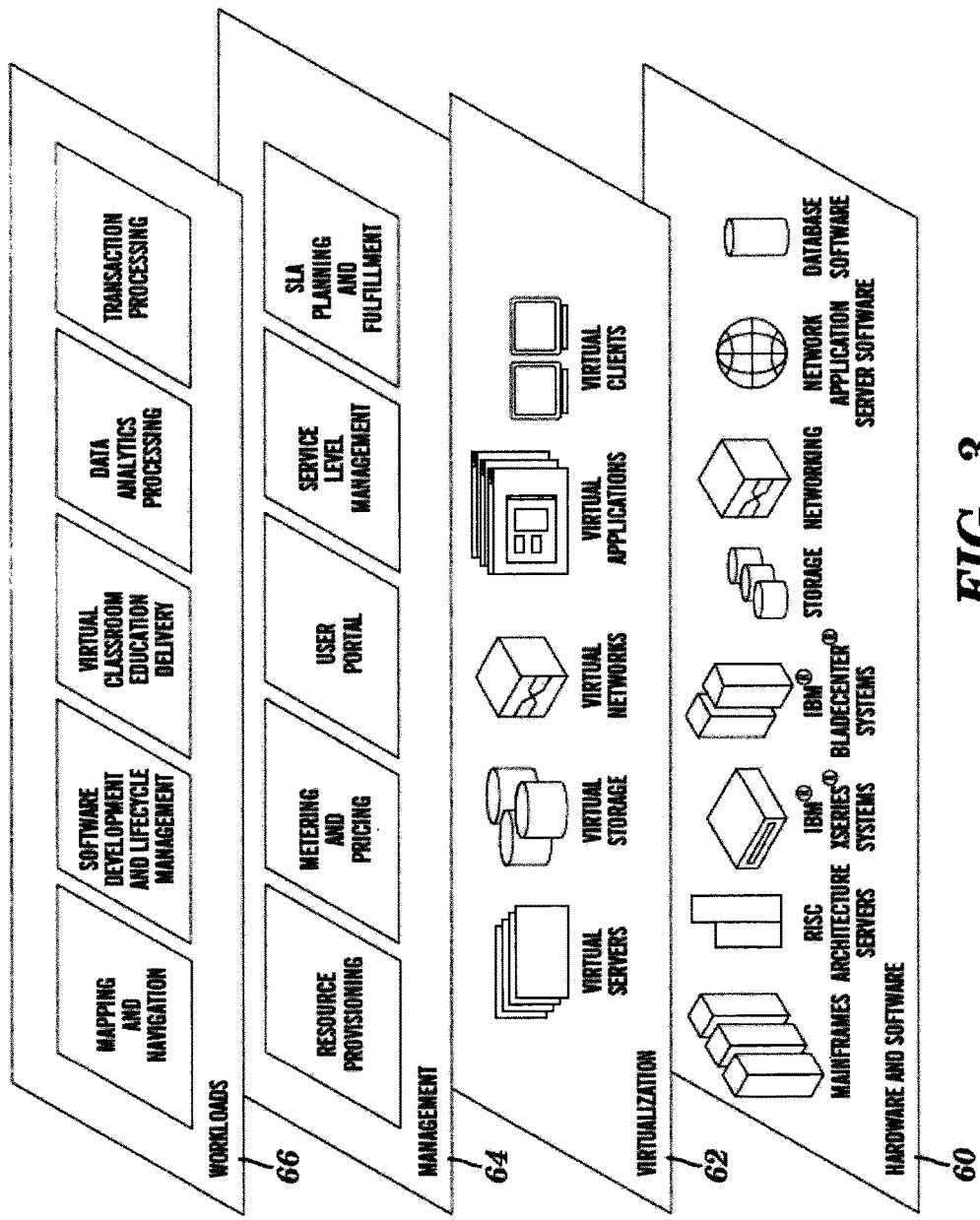
FIG. 3 illustrates a set of functional abstraction layers provided by a cloud computing environment in accordance with exemplary embodiments.

Referring now to FIG. 3, FIG. 3 illustrates a set of functional abstraction layers provided by cloud computing environment 50 (shown in FIG. 2). It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM® pSeries® systems; IBM® xSeries® systems; IBM® BladeCenter® systems; storage devices; networks and networking components. Examples of software components include network application server software, in one example IBM® WebSphere® application server software; and database software, in one example IBM® DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. The management layer 64 also includes a forecasting-based service assignment module.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing. Further, other types of workloads may also include web service workloads, enterprise applications such as billing and customer relationship management, various banking and finance applications, etc.

In exemplary embodiments, methods, systems and computer program products for creating, changing, simulating, testing and executing business rules to provide context-dependent transaction management with services within a cloud environment are provided. In exemplary embodiments, context-dependent transaction management may be full life cycle access management, which includes requesting access, approval of access, provisioning of access and re-certification of access. The business rules include one or more rules for enforcing separation of duties relating to people, software, data and the like. In exemplary embodiments, the cloud service may be a dedicated or shared cloud service and may include both applications and data access. In exemplary embodiments, the system enables automatic detection and/or prevention of violations of context-dependent access control within an application or cloud service or across applications or cloud services.

Figure 4:
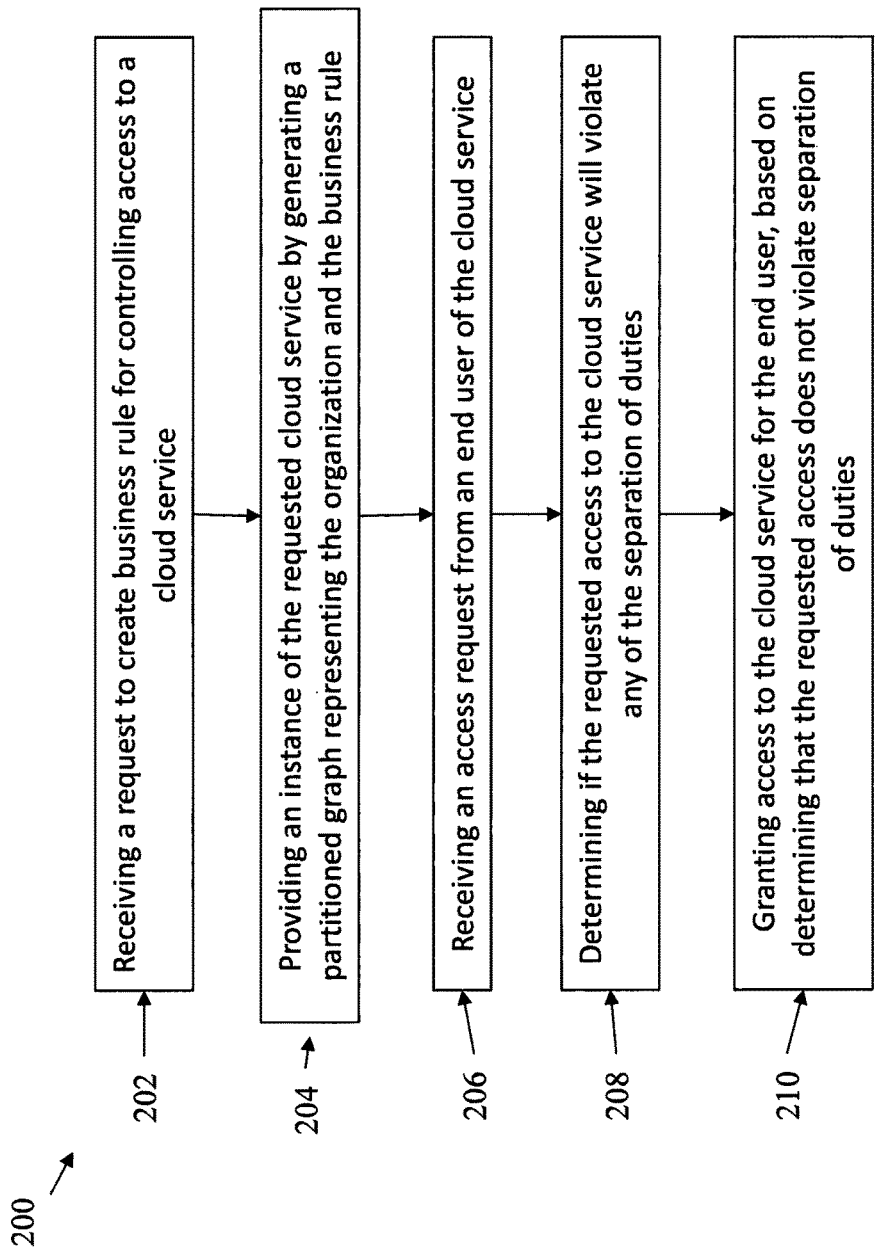
FIG. 4 is a flowchart illustrating a method for providing context-dependent access management of services within a cloud environment in accordance with an exemplary embodiment.

Referring now to FIG. 4, a flow chart illustrating an exemplary method 200 for providing context-dependent access management within a cloud environment is illustrated. The method 200 includes receiving a request to create a business rule for controlling access to a cloud service, as illustrated at block 202. In exemplary embodiments, the cloud service may be an application, database access, or another cloud service. Next, as shown at block 204, the method 200 includes providing an instance of the requested cloud service by generating a partitioned graph representing the organization and the business rule. The business rule includes one or more separation of duties requirements. In exemplary embodiments, the cloud service may also include metadata information related to separation of duties requirements. After the cloud service and corresponding business rules have been provisioned, the method 200 includes receiving an access request from an end user of the cloud service, as shown at block 206. Next, as shown at block 208, the method 200 includes determining if the access request to the cloud service violates any of the separation of duties requirements. If the requested access does not violate any of the separation of duties requirements, access to the cloud service is granted for the end user, as shown at block 212. Otherwise, access to the cloud service may be denied to the end user.

In exemplary embodiments, the determination that the access request results in a violation of a separation of duty may be binary determination, i.e., a violation or non-violation, or a non-binary determination of violation. In embodiments where the determination that the access request is non-binary, a confidence level may be calculated for the requested access and the calculated confidence level may be compared to a threshold confidence level. For example, a determination may be made that an access request has an eighty percent confidence level that it will not result in a violation of separation of duties. In exemplary embodiments, if the calculated confidence level is above a threshold confidence level, the end user will be granted the requested access.

In exemplary embodiments, if the calculated confidence level is below a threshold confidence level, the cloud system may perform a confidence-increasing action. In exemplary embodiments, the confidence-increasing action may include, but is not limited to: sending a message to an auditor for confirmation or more information; sending a signal to a confidence-increasing action information repository that may be checked later by software or a person; an increasing in monitoring or auditing during accesses, or prompting a user for additional information regarding the access request such as identification verification information. In one embodiment, the confidence-increasing action may be executed prior to granting the requested access. In another embodiment, the confidence-increasing action may be executed concurrently to granting the requested access and additional monitoring or reduced access privileges may be employed until the confidence-increasing action is complete. In exemplary embodiments, the threshold confidence level may be determined or changed by any of a user, an auditor, a manager, crowd sourcing, or by other means.

In exemplary embodiments, a system configured to provide context-dependent access management of a service within a cloud environment may utilize a context-dependent firewall to manage access rights to, and across, various cloud services. The term firewall is used in an extended way and goes beyond software-based or hardware-based means to keep a network secure. Firewall, as used here, is used (for example) in a broad sense to indicate any controlling layer that limits or facilitates transactions among two or more entities.

Figure 5:
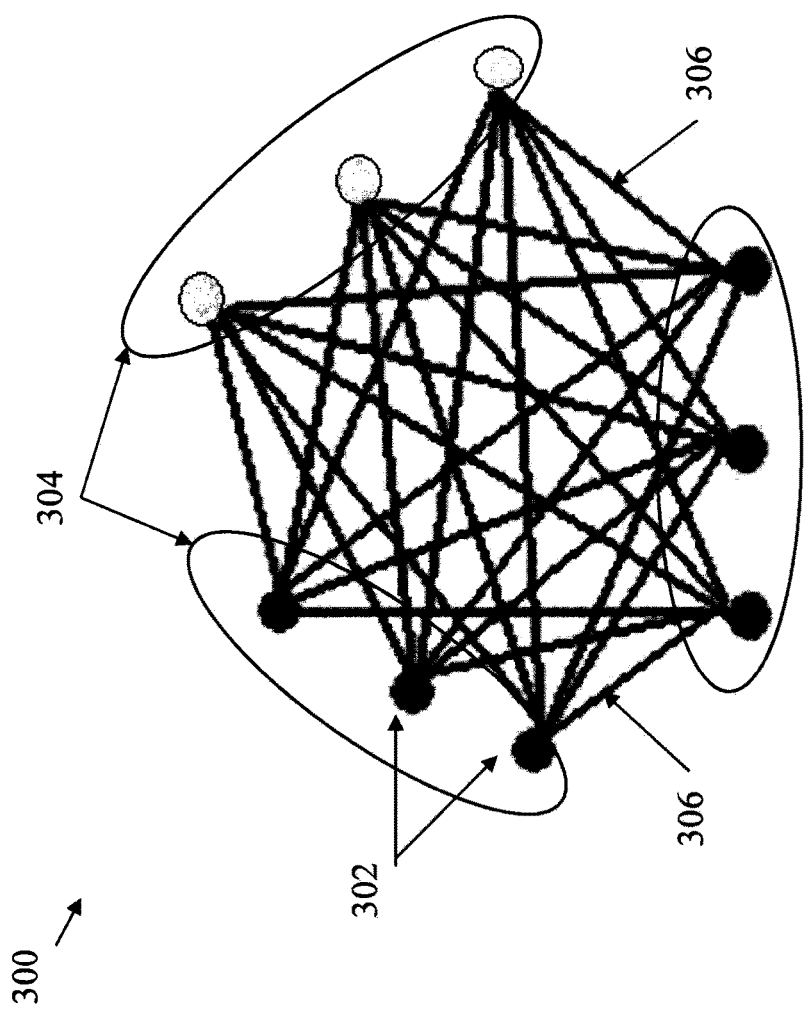
FIG. 5 is a partitioned graph for use with a context-dependent firewall for separation of duties in accordance with an exemplary embodiment.

Referring now to FIG. 5, a partitioned graph for use with a context-dependent firewall for separation of duties is shown. The partitioned graph 300 represents an organization and includes a plurality of nodes 302 that represent resources of the organization. In exemplary embodiments, the resources include a type that includes, but is not limited to, a person, data, an application, and the like. The nodes 302 are partitioned into one or more groups 304, where each group 304 includes nodes 302 that represent resources having the same type. The partitioned graph 300 also includes a plurality of linkages 306 that connect nodes 302. The linkages 306 represent access privileges between the two connected nodes 302 that do not violate any of the separation of duties requirements. For example, a linkage 306 between a node 302 representing a person and a node 302 representing an application indicates that the person is permitted to access the application. In another example, a linkage 306 between a node 302 representing an application and a node 302 representing data indicates that the application is permitted to access the data. Conversely, the absence of a linkage 306 between two nodes 302 indicates that access between the two nodes has not been granted.

In exemplary embodiments, a context-dependent firewall may include the management of the linkages 306 of the partitioned graph 300. In exemplary embodiments, blocking access to an application by a user may be performed by removing or cutting a linkage 306 between two nodes 302 in the partitioned graph 300. The context-dependent firewall can include one or more settings that allow various degrees of blocking. In exemplary embodiments, each linkage 306 may have an associated threshold confidence level, which is the minimum confidence level required to provide access between the nodes 302 connected by the linkage 306.

In exemplary embodiments, the cutting or removing of a linkage 306 may be restored by various means including, but not limited to, cutting or removing other linkages 306 in the graph, entering a password, and the like. In exemplary embodiments, the cutting or removing of linkage 306 of the partitioned graph 300 may be context dependent. For example, a user may be able to use one software application from a particular machine (e.g., a home computer) but is blocked from using the same software application from another machine (e.g., an office computer), due to separation of duties associated with one or more business rules. Additionally, context may include such considerations as user location (e.g., as determined by GPS, IP address range, etc.); user job role (e.g., as determined by a user's explicitly entry of his or her current role or as determined automatically by an assessment of various applications or services that are in current use by the user); or a user's current social network (e.g., the user is emailing individual x about topic y and sending instant messages to individual z.) In these kinds of examples, if desired, such monitoring may be done in an opt-in fashion or in a fashion that does not maintain information about a user's identity or social network so as to avoid unduly sacrificing user privacy.

In exemplary embodiments, the linkage between nodes of the partitioned graph 300 may be partial or complete. For example, a partial linkage may represent that a user may be able to access an application but with increased monitoring of the user's activity, decreased privacy, more frequent password entries, or the like. In exemplary embodiments, the firewall may be configured to learn from historical blocking data related to separation of duties corresponding to one or more business rules.

Figure 6:
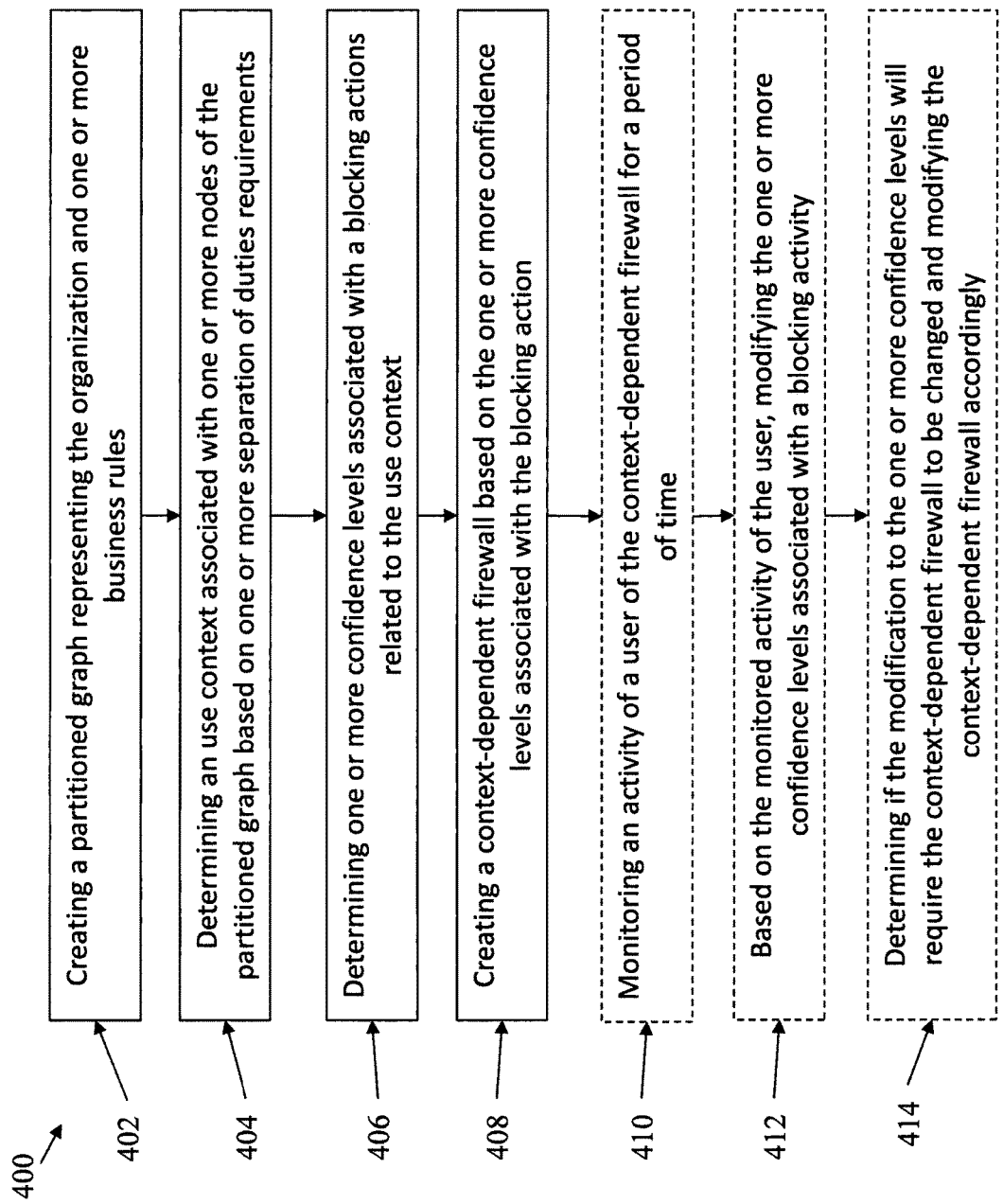
FIG. 6 is a flowchart illustrating a method for creating and managing a context-dependent firewall in accordance with an exemplary embodiment.

Referring now to FIG. 6, a flow chart illustrating an exemplary method 400 for providing a context-dependent firewall for an organization is illustrated. The method 400 begins by creating a partitioned graph representing the organization and one or more business rules, as illustrated at block 402. The partitioned graph may include a collection of linkages, dependencies, connections, and nodes. In exemplary embodiments, the linkages of the partitioned graph may be based on one or more business rules that include one or more separation of duties requirements. Next, as illustrated at block 404, the method 400 includes determining a use context associated with one or more nodes of the partitioned graph based on one or more separation of duties requirements. In exemplary embodiments, the use context may include one or more nodes associated with: a user identification; a user location; an accessed application; an accessed data; or the like. The method 400 also includes determining one or more confidence levels associated with a blocking action related to the use context, as shown at block 406. In exemplary embodiments, the blocking action is indicative that the use context violates one of the one or more separation of duties requirements. As shown at block 408, a context-dependent firewall is created based on the one or more confidence levels associated with the blocking action. In exemplary embodiments, the context-dependent firewall is configured to prevent a user from accessing applications or data that would violate on one or more business rules and associated separation of duties.

In exemplary embodiments, as shown at block 410, the method 400 may include monitoring an activity of a user of the context-dependent firewall for a period of time. Next, as shown at block 412, the method 400 may include modifying the one or more confidence levels associated with a blocking activity, based on the activity of the user during the period of time. As shown at block 414, the method 400 includes determining if the modification to the one or more confidence levels will require the context-dependent firewall to be changed and modifying the context-dependent firewall accordingly.

In exemplary embodiments, an activity of a user may be monitored over a period of time and based on the user's activity, the confidence level associated with a blocking action may be increased or decreased. For example, when a user is accessing an application from a home computer the confidence level associated with a blocking action may increase as an idle time of a user increases. Accordingly, if a user has been idle for an extended period of time, the confidence level of a blocking action may increase and access to an application or data can be blocked. The access to an application or data can be restored by the user re-entering a password or otherwise requesting a restoration of access privileges.

In accordance with an exemplary embodiment, a method for automating provisioning separation of duties requirements in a cloud environment is provided. The method for automating provisioning separation of duties requirements includes the determination, enforcement, and revision of the separation of duties requirements in the cloud environment. The method may be configured to use detected violations, or blocking actions, by the context-dependent firewall to automatically trigger one or more access management events. In exemplary embodiments, the one or more access management events may include, but is not limited to, the formation of a new linkage on the partitioned graph representation of the organization.

In exemplary embodiments, the method for automated provisioning separation of duties in a cloud environment may be configured to determine a use context requiring a new provisioning of access management, query users to regarding the need for provisioning and use context for the new linkage, and assign a probability of an separation of duties requirements violation under the use context. The use context may include a variety of information such as the location of the employee, identification of the employee and application access (e.g. work, home, public network, etc.) and a role of the user. In exemplary embodiments, a user may have more than one role. A user may work for more than one company, or division within a company, and thus have more than one role within the company. For example, a user may be a manager of some employees and be allowed to access human recourses (HR) files for those employees but the user is not able to access the HR files of other employees. In addition, a user or manager may have various keys that control the firewall and firewall access characteristics.

In an exemplary embodiment, a set of organizational resources for a business is represented as a partitioned graph by an officer to create a context-dependent firewall within the business to assure compliance with certain business rules, or regulations. The officer specifies contexts under which these business rules apply and thereby creates an initial linkage scheme for the partitioned graph. The system then monitors usage context information and applies the context-dependent firewall to the detected use contexts. During operation of the system, another officer with the organization recognizes that the context-dependent firewall has been inappropriately applied to her, and requests a modification of the context-dependent firewall. The system deploys an active learning component and determines that the context in which the second officer can violate the context-dependent firewall is specific to her other duties which she is engaged in when the modification request was made. The system creates a new linkage corresponding to the determined use context and applies the new linkage when the use context is recognized in the future.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer implemented method for providing context-dependent transactional management within a cloud environment, the method comprising:
   receiving a request to create a business rule for controlling a transaction within a cloud computing environment for an organization;
   providing an instance of the cloud computing environment for provisioning the business rule by generating a partitioned graph representing the organization and the business rule, wherein the business rule includes one or more separation of duties requirements, and wherein the partitioned graph representing the organization comprises:
     a plurality of nodes that each represent a resource of the organization; and
     a plurality of linkages that each connect two of the plurality of nodes, wherein each of the plurality of linkages includes a threshold confidence level, which is a minimum confidence level required such that request access between the plurality of nodes does not violate the one or more separation of duties requirements;
   determining, by a processor, a use context associated with the partitioned graph based on the one or more separation of duties requirements;
   responsive to a blocking action, determining one or more confidence levels associated with the blocking action related to the use context, wherein the blocking action is indicative that the use context violates one of the one or more separation of duties requirements, wherein determining includes comparing the one or more confidence levels associated with the blocking action to the threshold confidence level associated with one or more of the plurality of linkages that correspond to the use context;
   creating a context-dependent firewall based on the one or more confidence levels associated with the blocking action;
   monitoring one or more new blocking actions;
   determining one or more confidence levels associated with the one or more new blocking actions related to the use context, wherein the one or more new blocking actions are indicative that the use context violates one of the one or more separation of duties requirements, wherein determining includes comparing the one or more confidence levels associated with the one or more new blocking actions to the threshold confidence level associated with the one or more of the plurality of linkages that correspond to the use context; and
   responsive to the determination of one or more confidence levels associated with the one or more new blocking actions related to the use context, updating the context-dependent firewall.

2. The method of claim 1, wherein the resources of the organization comprise:
   people;
   applications; and
   data.

3. The method of claim 1, wherein the access request includes an identification of one or more of the plurality of nodes associated with the end user of the cloud service.

4. The method of claim 1, wherein based on determining that the access request to the cloud service violates one of the one or more separation of duties requirements, performing a confidence-increasing action.

5. The method of claim 4, wherein the confidence-increasing action includes at least one of:
   requesting additional information regarding the access request; and
   increasing a monitoring level during transaction with the cloud service.

6. A computer implemented method for providing a context-dependent firewall for an organization, the method comprising:
   creating a partitioned graph representing the organization and one or more business rules, wherein each of the business rules includes one or more separation of duties requirements and wherein the partitioned graph representing the organization comprises:
   a plurality of nodes that each represent a resource of the organization; and
   a plurality of linkages that each connect two of the plurality of nodes, wherein each of the plurality of linkages includes a threshold confidence level, which is a minimum confidence level required such that request access between the plurality of nodes does not violate the one or more separation of duties requirements;
   determining, by a processor, a use context associated with the partitioned graph based on the one or more separation of duties requirements;
   responsive to a blocking action, determining one or more confidence levels associated with the blocking action related to the use context, wherein the blocking action is indicative that the use context violates one of the one or more separation of duties requirements, wherein determining includes comparing the one or more confidence levels associated with the blocking action to the threshold confidence level associated with one or more of the plurality of linkages that correspond to the use context;
   creating a context-dependent firewall based on the one or more confidence levels associated with the blocking action;
   monitoring one or more new blocking actions;
   determining one or more confidence levels associated with the one or more new blocking actions related to the use context, wherein the one or more new blocking actions are indicative that the use context violates one of the one or more separation of duties requirements, wherein determining includes comparing the one or more confidence levels associated with the one or more new blocking actions to the threshold confidence level associated with the one or more of the plurality linkages that correspond to the use context; and
   responsive to the determination of one or more confidence levels associated with the one or more new blocking actions related to the use context, updating the context-dependent firewall.

7. The method of claim 6, wherein the use context includes an identification of one or more of the plurality of nodes and the one or more plurality of linkages associated with the business rule.

8. The method of claim 6, wherein the method further comprises:
   monitoring an activity of a user of the context-dependent firewall for a period of time;
   based on the activity of the user during the period of time, modifying the one or more confidence levels associated with the blocking action;
   determining if the modification to the one or more confidence levels will require the context-dependent firewall to be changed; and
   based on determining that the context-dependent firewall is required to be changed, modifying the context-dependent firewall.

9. The method of claim 8, wherein determining if the modification to the one or more confidence levels will require the context-dependent firewall to be changed includes:
   comparing one or more modified confidence levels to the threshold confidence level;
   based on determining that the one or more modified confidence levels has been increased to exceed the threshold confidence level, indicating that the context-dependent firewall is required to be changed; and
   based on determining that that the one or more modified confidence levels has been decreased below the threshold confidence level, indicating that the context-dependent firewall is required to be changed.

10. The method of claim 6, wherein the method further comprises:
    receiving an access request from an end user;
    determining that the access request violates the one or more separation of duties requirements;
    requesting an additional information regarding the requested access from the end user;
    computing a new linkage of the partitioned graph based on the access request; and
    based on the additional information regarding the requested access received from the end user, provisioning the new linkage in the partitioned graph and modifying the context-dependent firewall.

11. The method of claim 10, wherein computing the new linkage comprises:
    determining a context associated with the access request; and
    determining if the new linkage is a replacement for an existing linkage in the partitioned graph or an alternative linkage.

\* \* \* \* \*